July 2, 1968 R. A. McCALLISTER 3,390,719
HEAT EXCHANGER VALVE SYSTEM
Filed March 7, 1966 3 Sheets-Sheet 2

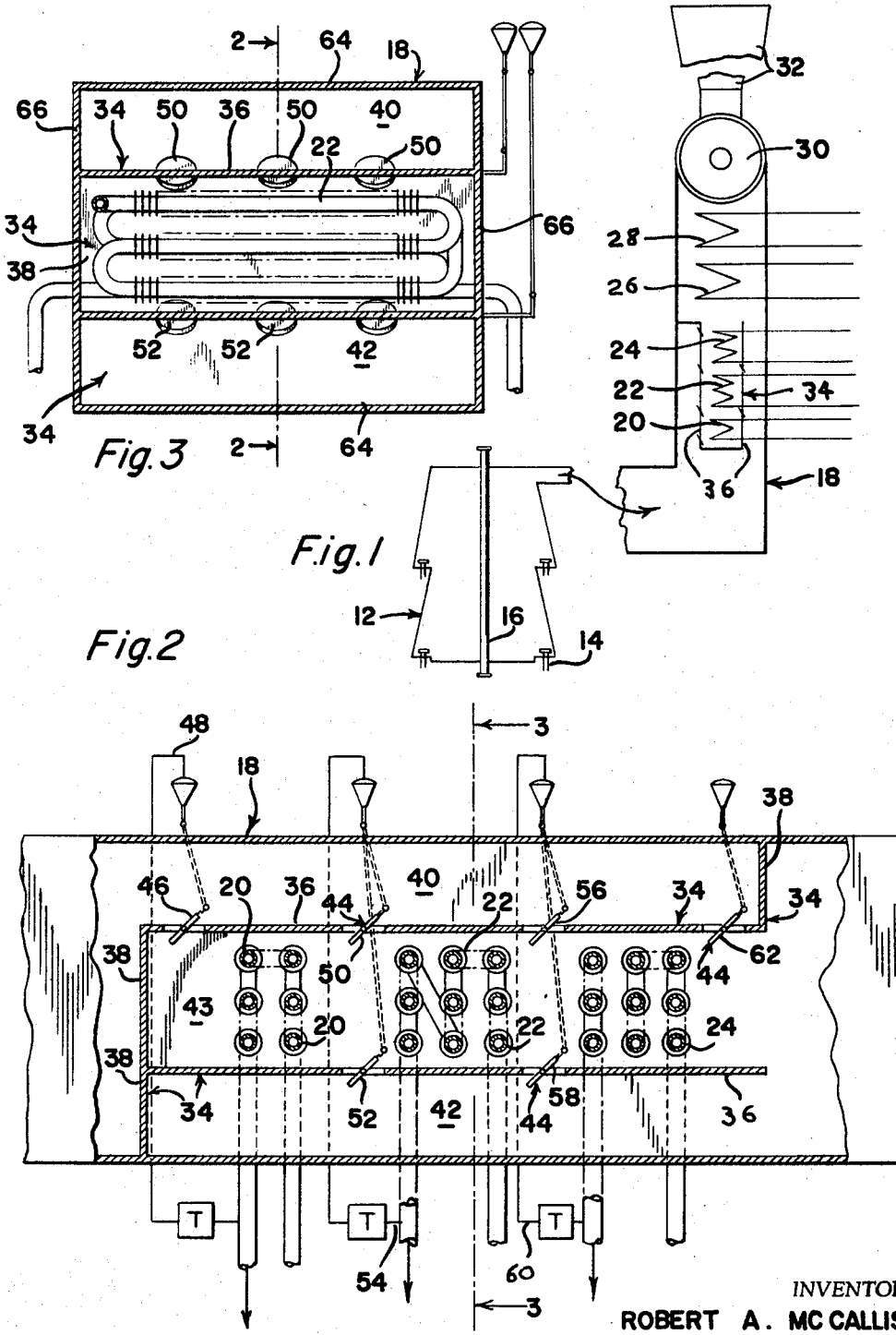

INVENTOR.
ROBERT A. McCALLISTER
BY Martin Allen Farber
ATTORNEY

INVENTOR.
ROBERT A. MCCALLISTER
BY
ATTORNEY

United States Patent Office

3,390,719
Patented July 2, 1968

3,390,719
HEAT EXCHANGER VALVE SYSTEM
Robert A. McCallister, Fort Lee, N.J., assignor to Foster Wheeler Corporation, Livingston, N.J., a corporation of New York
Filed Mar. 7, 1966, Ser. No. 532,383
12 Claims. (Cl. 165—37)

ABSTRACT OF THE DISCLOSURE

A heat exchanger system in which a valve arrangement is provided for controlling the amount of heat exchanger fluid passing in indirect heat exchange over portions of the system.

---

The invention has particular advantage for controlling the recovery of heat from flue gases in the convection section of a furnace having a large potential heat recovery but low available pressure drop through the recovery equipment. It has special application to process plants having a fired heater furnace for heating a process fluid in which the by-product waste flue gases have a residual heat content which is used to heat other process streams in the convection section of the furnace.

In such systems it is desirable to obtain efficient heat recovery and to control the outlet temperature of the various streams that are heated for various downstream process requirements. The need for on-stream temperature control arises from the uncertainty of obtaining the desired temperatures in the streams resulting from the difficulty in predicting exact heat transfer rates during design; fouling of heat exchanger surfaces with time (especially where the furnace is fired with coal or oil); varying furnace and stream loads; transient start-up conditions and start-up overfiring; and burnout safety factors used in design. Notwithstanding the need, present schemes to control the temperatures of the various streams and obtain good heat recovery have not been satisfactory.

Certain prior systems used parallel gas flow control across the various streams, frequently combined with gas recirculation pumps. Others utilized series gas flow over the streams for maximum heat recovery from the gas, controlling the individual stream temperatures to some extent by various means, e.g., furnace firing rate control, supplemental convection section burners (primarily for supplemental heat), quench means, or means for varying the quantity of the stream fluid passing through the convection section. With the latter series flow systems, the heat recovery was maximized, but any attempted control of one stream affected the available heat for the other streams and good control was not achieved; with the former parallel flow systems, heat recovery was sacrificed at the expense of parallel (by-pass) flow control.

Accordingly, it is an object of the present invention to provide an improved, heat exchange control system.

It is another object of this invention to provide a simple and satisfactory system of control in which heat is transferred to a series of independent external streams with the outlet temperature of each being controlled as required.

It is also an object of the present invention to provide an improved flue gas control system having combined parallel flue gas flow control with series flue gas heat recovery flow across the independent streams to obtain good temperature controllability and satisfactory heat recovery.

Accordingly, the present invention provides a heat exchange control system for varying both series flue gas flow over the external stream or streams, and simultaneously, parallel flue gas flow. Also provided in accordance with the present invention is a convection section passageway containing passageway fluid therein, and a partition means dividing the passageway into three sections: one section is an elongated conduit channel along which a plurality of heat exchanger tube sections are arranged in tandem; the second section, is an entrance channel; and the third section is an exit channel. The partition means also isolates the entrance channel from the conduit channel and the exit channel. An adjustable valve means is provided in the partition means near the inlet end of the conduit channel for proportioning passageway fluid flow into the conduit channel for heating the tube sections, the remainder passing through the entrance channel by-passing portions of the conduit channel and tube sections. A plurality of other entrance valve means are provided at various positions along the partition communicating the entrance channel with the conduit channel for passing additional passageway fluid into the conduit channel from the entrance channel at various positions therealong to control the heat input to various tube sections. Also provided are a plurality of exit valve means at various positions along the partition communicating the conduit channel with the exit channel for by-passing excess flow from the conduit channel to the exit channel at various points.

It will be apparent that with the heat exchanger control of this invention various heat exchanger tube sections can be individually and/or simultaneously controlled so as to receive varying quantities of hot or relatively cool flow according to the independent requirements of the individual tube sections. Series flow, superimposed with parallel flow control is achieved providing excellent heat recovery and individual tube section controllability.

These and other objects and advantages of the invention will become apparent upon consideration of the specification and accompanying drawings, in which:

FIGURE 1 is a typical process plant application of the heat control system of the present invention;

FIGURE 2 is an enlarged sectional view of the control system of FIG. 1 taken along the line 2—2 of FIG. 3, described hereafter;

FIGURE 3 is an enlarged cross-sectional view of the control system taken along the line 3—3 of FIG. 2;

Figure 4A:
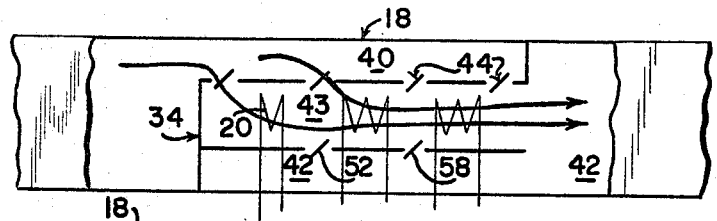
FIGURES 4A, 4B and 4C are diagrammatic representations of the control system of the present invention demonstrating in separate diagrams the combined series, parallel and by-pass gas flow achieved with the present invention.

FIGURES 10A, 10B, 11A, and 11B show arrangements with the conduit channel adjacent the flue gas passageway.

Referring now to FIG. 1 for a typical application of the heat control system of the present invention in the production of methanol synthesis gas. A fired heater furnace 12 fired with fuel gas in burners 14 heats a primary process fluid in catalyst tubes 16 in the furnace. The waste heat flue gases, typically in the neighborhood of 1800–2300° F. leave the furnace section and enter the convection section passageway 18.

Disposed in the convection section passageway for heat recovery are three tandem arranged superheaters 20, 22 and 24, for heating, in this example, process steam (in superheater 20), natural process gas (in superheater 22) and turbine steam (in superheater 24), with the hot flue gases. A steam generator tube bank 26 and a boiler feed water preheat tube bank 28, follow in passageway 18. An induced draft fan 30 disposed in the passageway beyond tube bank 28 provides suction causing the flue gases to pass over the tube banks, passing the cooled flue gases (approximately 400–800° F.) to the atmosphere through furnace stack 32.

Adjacent the superheaters 20, 22 and 24 is a partition 34 made of stainless steel comprising two conduit plates 36 extending along the passageway between which the superheaters are contained for controlling the temperature of the fluid streams in the superheaters. The partition is shown in detail in FIG. 2 and also comprises partition end walls 38 which with the conduit plates separate the passageway 18 into three independent sections, i.e., a flue gas entrance channel 40, a flue gas exit channel 42 and a conduit channel 43. The conduit channel is centrally located in the passageway between the plates 36, the entrance and exit channels 40 and 42, respectively, being adjacent thereto.

A series of adjustable butterfly valves or dampers 44 in the partition 34 regulate the flow of the hot flue gas through each of the heat exchanger tube banks 20, 22 and 24 in such a way as to independently control the outlet temperature of the fluid in each of the superheaters. In operation, the flue gas flow is divided between the entrance channel 40 and the conduit channel 43 by a first entrance valve 46 disposed in the partition adjacent the entrance channel. The flue gas flow through valve 46 into the conduit channel 43 is controlled so that sufficient flue gases pass over the first tube bank 20 to heat the fluid leaving the tube bank 20 to a desired outlet temperature (in a typical example the tube fluid enters at 415° and is maintained at an outlet temperature of 970° F.). This may be accomplished manually, or automatically by a control means 48 which is shown connected to valve 46 and responsive to the outlet temperature of the fluid in the heat exchanger bank 20.

As a result of the temperature control for the first tube bank 20, the flue gas entering the second tube bank 22 may be either too cold or too hot to meet the heating requirements of the second tube bank 22. In the event these gases are too cold a second entrance valve 50 is provided on the conduit plate 36 adjacent the entrance channel 40, between the first and second tube banks 20 and 22, for passing additional hot flue gases (which have by-passed bank 20) into the conduit channel 43 from the entrance channel 40 as are required to heat the fluid in the second tube bank 22 to its desired outlet temperature. Similarly, in the event the gases passing over the first tube bank 20 are too hot, a first exit valve 52 is provided in the conduit plate adjacent the exit channel 42, between the first and second tube banks, for by-passing some of the gases in the conduit channel 43, before reaching the second tube bank 22, away from the second tube bank 22 into the exit channel 42. (In a typical example the second tube fluid enters at 60° F. and is controlled to maintain an outlet temperature of 970° F.) Automatic control 54 responsive to the outlet temperature of the fluid in the second tube bank may be utilized to control valves 50 and 52, according to the heating requirements of the second heat exchanger tube bank.

For controlling the third heat exchanger tube bank 24, a third entrance valve 56 and a second exit valve 58 are provided on the conduit plates 36 between the second and third tube banks (22 and 24) adjacent the entrance channel 40 and exit channel 42, respectively. Entrance valve 56 introduces additional hot flue gas into the conduit channel (which has by-passed banks 20 and 22 in the entrance channel 40) to meet the requirements of heat exchange in the third exchanger bank 24 in the event the gas in the conduit channel 43 leaving the second bank 22 is too cool. If this gas leaving bank 22 is too hot, excess flue gas is bled from the conduit channel 43 before passing over the third tube bank 24 through the second exit valve 58 into the exit channel 42 to reduce the flue gas flowing over the third tube bank to the quantity required to meet its heat exchange requirements. (In one typical example the third tube bank fluid enters at a temperature of 416° F. and is heated isothermally by the controlled flue gases to exit at an outlet temperature of 416° F.) This may be accomplished manually, or automatically by a control means 60 which is shown connected to valves 56 and 58 and responsive to the outlet temperature of the fluid in the third tube bank 24.

A certain quantity of the flue gas may be allowed to completely by-pass the heat exchanger banks 20, 22 and 24 through channel 40. This quantity of flue gas flows through a back pressure valve 62 at the outlet end of the partition providing sufficient back pressure to allow satisfactory operation of the other valves and meet the pressure drop requirements of the heat exchanger banks 20, 22 and 24. The induced draft fan 30 provides a total pressure drop across the system (approximately 1 p.s.i. maximum) to assure satisfactory operation. Valve 62 as the other valves may be operated manually or automatically.

The partially cooled flue gases leaving the third heat exchanger bank 24, cooled to approximately 1500–1800° F. (along with the flow from channels 40 and 42) flow to the additional heat recovery banks 26 and 28 which recover further heat from the gases and which usually do not require temperature control. Where these banks require temperature control, the partition 34 can be extended to enclose these banks, and additional valves provided, as above, for temperature control.

It should now be apparent that with this invention, the individual tube banks 20, 22 and 24 may be each independently controlled to attained a desired outlet temperature without upsetting the ability to independently control the other banks.

FIG. 3 shows a cross-sectional view through the passageway 18 at the second tube bank showing two entrance valves 50 and two exit valves 52 for control of the second heat exchanger tube bank 22, the number of entrance and exit valves for each bank being a matter of design.

An advantage of this control system is that little additional convection section passageway wall area 18 is required to house the control system. Only the passageway end walls 64 are enlarged to permit sufficient valve space for the flue gas flow to enter and exit from the conduit channel. The side walls 66 remain the same size as without such a control system.

Figure 4B:
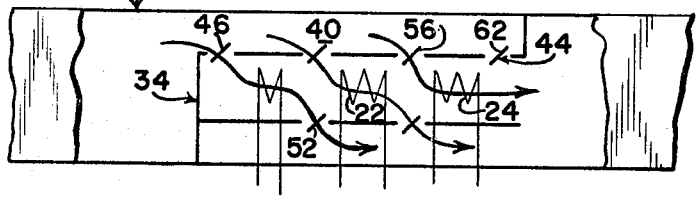
Figure 4C:
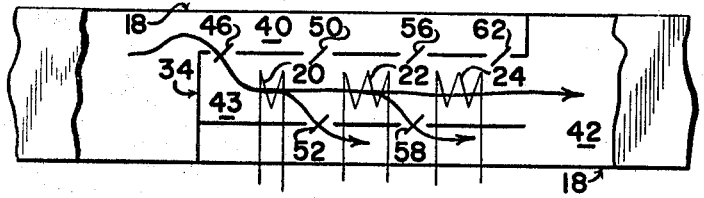

Other advantages of this system should now be apparent. FIG. 4 shows the combined series and parallel flue gas flow achieved with the present invention. Series flue gas flow (FIG. 4A) is important for extracting as much waste heat from the gas flow as possible by passing the gases over as many heat exchanger banks as practical. Parallel flue gas flow (FIG. 4B), and by-passing portions of the series flow (FIG. 4C), permit independent temperature control of the fluid in the heat exchanger banks 20, 22 and 24. Although for purposes of description FIG. 4 is shown as three diagrams, each indicating only one type of flow, the actual gas flow of the system is the superimposed flow of all these figures. Consequently, with this invention the advantages of series and parallel flue gas control are combined.

It should now be apparent that a principal feature of the present invention is this utilization of series flow with parallel flow control to achieve good heat recovery with optimum temperature control.

Butterfly valves 44 are advantageously used in the low pressure drop system of FIG. 1. Further, with the back pressure valve 62 susfficiently adjusted, the entrance and exit valves may be adjusted to be operated near their optimum control positions, about the 60% open position. Also the flue gass partition 34 offers little flow resistance making it suitable for low pressure drop systems. The flow resistance may be further reduced by fluid-dynamically inclining the inlet end wall 38 (not shown).

Figure 5:
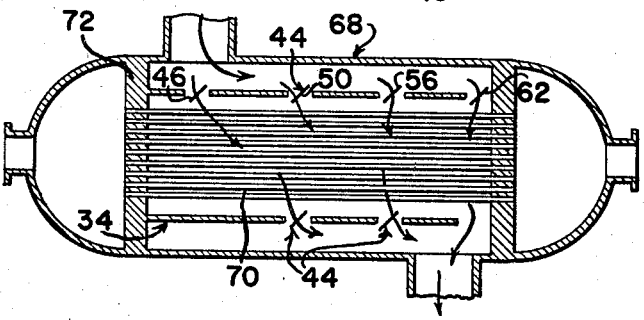
FIGURE 5 is a shell and tube heat exchanger in accordance with the present invention.

FIG. 5 shows the control system of the invention in a shell and tube heat exchanger 68. This permits the fluid temperature in the heat exchanger tubes 70 to be controlled to achieve desired temperatures at various positions along the tubes providing uniform heat transfer and avoiding tube burnout. It also can be adjusted to decrease the heat flux at the inlet tube sheet 72, the point of maximum temperature, accordingly lowering the metal temperature and decreasing the possibility of corrosion of the tube sheet.

Figure 7:
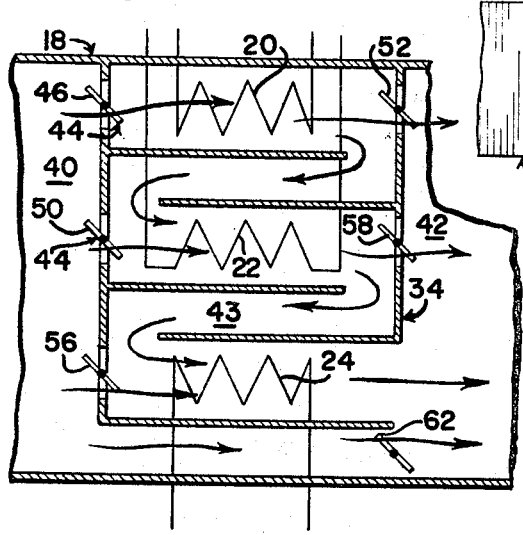
FIGURES 7, 8 and 9 are variant arrangements of the present invention.
Figure 6:
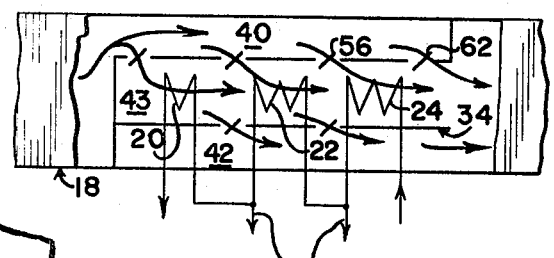
FIGURE 6 shows the control system for a single tube bank with by-pass lines.
Figure 8:
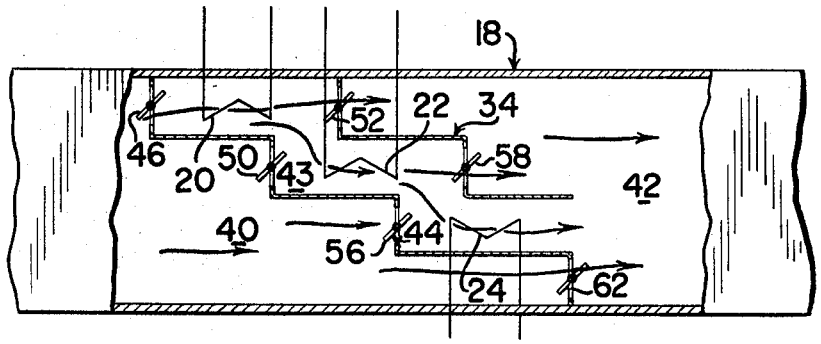
Figure 9:
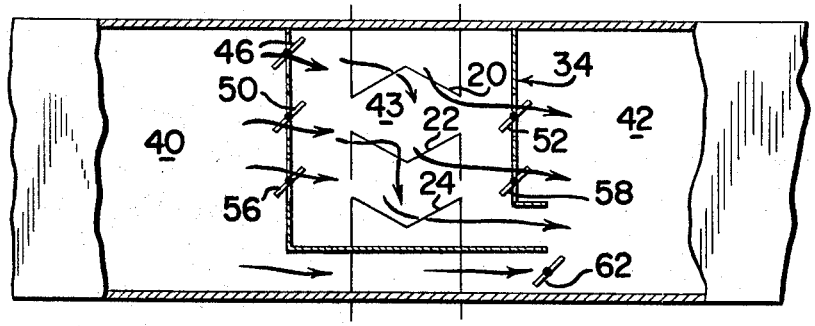

FIG. 6 schematically shows a superheater tube bank arranged in series flow with provision for by-passing flow from the banks from various by-pass points 74 at controlled temperatures. FIG. 9 shows that the partition 34 of FIGS. 1 and 2 may be disposed angularly toward the passageway wall. In this case the entrance channel 40 and exit channel 42 are coextensive with the passageway 18. FIGS. 7 and 8 show variant arrangements for achieving the combined series-parallel flue gas flow of the invention. It is apparent from a comparison of these figures with FIGS. 2 and 9 that by locating the entrance and exit valves at points intermediate to adjacent tube banks (as in FIGS. 2 and 9) that the baffles 76 of FIG. 7 (or the partition arrangement of FIG. 8) can be eliminated to direct the flue gas flow over the tube banks.

Figure 10A:
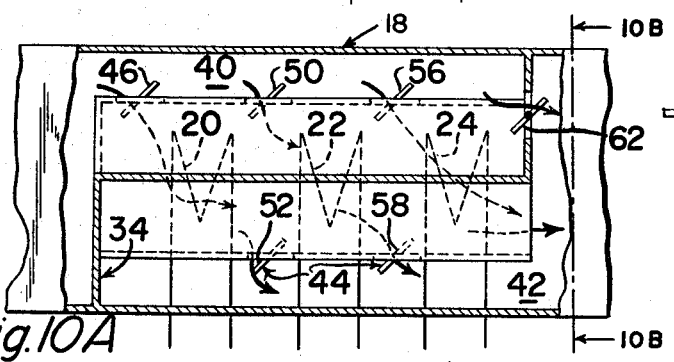
Figure 10B:
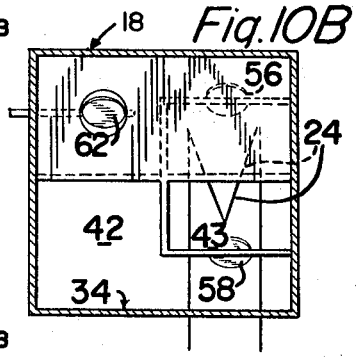
Figure 11A:
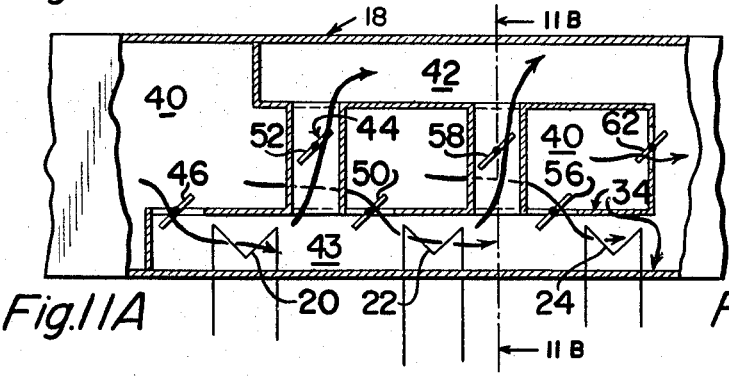
Figure 11B:
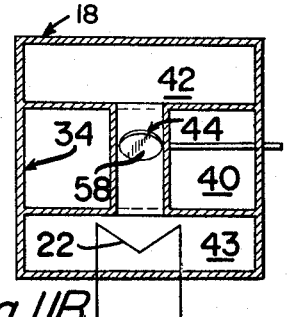

FIGS 10A and 10B show that the conduit channel 43 can be located adjacent the walls of the passageway 18 and FIGS. 11A and 11B show that the entrance and exit channels need not lie adjacent the conduit so long as crossover channels 78 are provided to conduct the flow therebetween.

In the embodiment of FIGS. 1 and 2, it is preferred that the superheater streams 20, 22 and 24 to be controlled be located in the conduit channel flow path in order of descending stream outlet temperature, i.e., the desired outlet temperature of stream 20 hotter than that of stream 22, and that of stream 22 hotter than that of stream 24. In this manner, better heat recovery efficiencies are obtained with the hottest desired stream receiving the hottest upstream flue gases. The invention is not limited, however, to such superheater arrangements. In addition to use with different superheater temperatures in methanol synthesis gas plants, the present invention is also useful in ammonia plants, as well as other process plants, with different fluids in the superheaters and various superheater temperature requirements. The present invention is also useful in high pressure drop systems and it is to be understood that the invention is not limited to waste heat recovery systems. Also, in certain applications the fluid flowing about the tubes may be the fluid to be heated instead of the heating fluid.

Although the invention has been described with respect to specific embodiments, many other variations within the spirit and scope of the invention as defined in the following claims will be apparent to those skilled in the art.

What is claimed is:

1. A heat exchanger control system comprising,
a flue gas passageway having walls for passing a passageway fluid therethrough,
partition means disposed in the passageway dividing the passageway into an elongated conduit channel, an entrance channel and an exit channel, said partition means separating the entrance channel from the conduit channel and from the exit channel, said conduit channel having an inlet end and an outlet end, the entrance channel communicating with the passageway fluid,
at least two heat exchanger tube banks disposed in the conduit channel in tandem having a tube fluid therein,
first adjustable entrance valve means in the partition means adjacent the inlet end for passing varying proportions of the passageway fluid into the conduit channel, one of the tube banks disposed in the conduit channel for receiving said proportions of passageway fluid passing into the conduit channed, the remainder of the passageway fluid flowing through the entrance channel,
at least one second adjustable entrance valve means in the partition means adjacent the entrance channel communicating the entrance channel with the conduit channel intermediate the inlet end and the outlet end for passing quantities of passageway fluid from the entrance channel into the conduit channel, another of the tube banks disposed in the conduit channel for receiving said quantities of passageway fluid passing into the conduit channel,
at least one adjustable exit valve means in the partition means adjacent the exit channel communicating the conduit channel with the exit channel intermediate the inlet end and the outlet end for removing portions of fluid from the conduit channel into the exit channel by-passing at least one of said tube banks,
outlet means communicating with the passageway at the outlet end for removing fluid from the conduit channel at the outlet end and for removing fluid from the exit channel.

2. A heat exchanger control system according to claim 1 wherein said heat exchanger tube banks comprise independent banks containing separate fluid therein.

3. A heat exchanger control system according to claim 2 wherein said second adjustable entrance valve means and said exit valve means are substantially intermediate adjacent heat exchanger tube banks.

4. A heat exchanger control system according to claim 3 wherein the conduit channel, the entrance channel and the exit channel are parallel to the passageway.

5. A heat exchanger control system according to claim 4 wherein the partition means comprises two aligned plates in spaced relationship from the passageway walls and from each other, said conduit channel being between said plates, the entrance channel between one plate and the passageway wall and the exit channel being between the other plate and the passageway wall.

6. A heat exchanger control system according to claim 5 further comprising an adjustable back pressure valve means disposed in the partition means communicating with the entrance channel adjacent the outlet end for by-passing portions of the passageway fluid from all of the tube banks.

7. A heat exchanger control system according to claim 6 further comprising a fan means for establishing a sufficient pressure drop across the partition means.

8. A heat exchanger control system according to claim 7 wherein the pressure drop across the partition means is low.

9. A heat exchanger of claim 8 further comprising,
first control means for varying the first adjustable entrance valve means according to the outlet temperature of the tube fluid in said one of the tube banks,
second control means for varying one of said exit valve means and one of said second adjustable entrance valve means both of said valve means disposed intermediate the same adjacent tube banks, according to the outlet temperature of the tube fluid in the adjacent downstream tube bank.

10. A shell and tube heat exchanger control system comprising,
an elongated heat exchanger shell for passing a shell fluid therethrough,
a partition means dividing the shell into an elongated conduit channel, an entrance channel and an exit channel, said conduit channel disposed in spaced relationship from the passageway walls, said partition means isolating the entrance channel from the exit channel and the conduit channel,
an elongated tube bundle disposed within the conduit channel having a tube fluid therein,
means for passing said shell fluid into the entrance channel,
a plurality of adjustable entrance valves disposed along the partition means adjacent the entrance channel for passing the shell fluid into the conduit channel, a plurality of adjustable exit valves disposed along the partition means adjacent the exit channel for passing the shell fluid out of the conduit channel.

11. A heat exchanger arrangement comprising, wall means defining an elongated passageway having an upstream end and a downstream end, a plurality of heat exchanger tube sections longitudinally disposed in tandem relationship in said passageway, said wall means defining a series of at least two entrance apertures and at least two exit apertures, the entrance and exit apertures being arranged with respect to said valve means whereby the fluid flow is directed alternatively lengthwise in the passageway for series flow over said tube section and transversely in said passageway for parallel flow over said tube sections and for substantial bypass of at least one of said tube sections.

12. A heat exchanger arrangement comprising, wall means defining an elongated passageway having an upstream end and a downstream end, a plurality of heat exchanger tube sections longitudinally disposed in tandem relationship in said passageway, said wall means defining a first entrance aperture at the upstream end of said passageway by which fluid is admitted to said passageway, said wall means further defining at least two exit apertures and a second entrance aperture located downstream of said first entrance aperture, and valve means in said apertures whereby the flow can alternatively be directed in parallel and in series over said tube sections.

References Cited

UNITED STATES PATENTS 2,683,590   7/1954   Baver _____ 165—97

FOREIGN PATENTS 1,067,337   6/1954   France.

ROBERT A. O'LEARY, *Primary Examiner.*

C. SUKALO, *Assistant Examiner.*